Feb. 12, 1924.

R. H. LANGDALE 1,483,191

RESILIENT WHEEL

Filed Nov. 4, 1921

INVENTOR:
Rupert H. Langdale.
BY
ATTORNEYS.

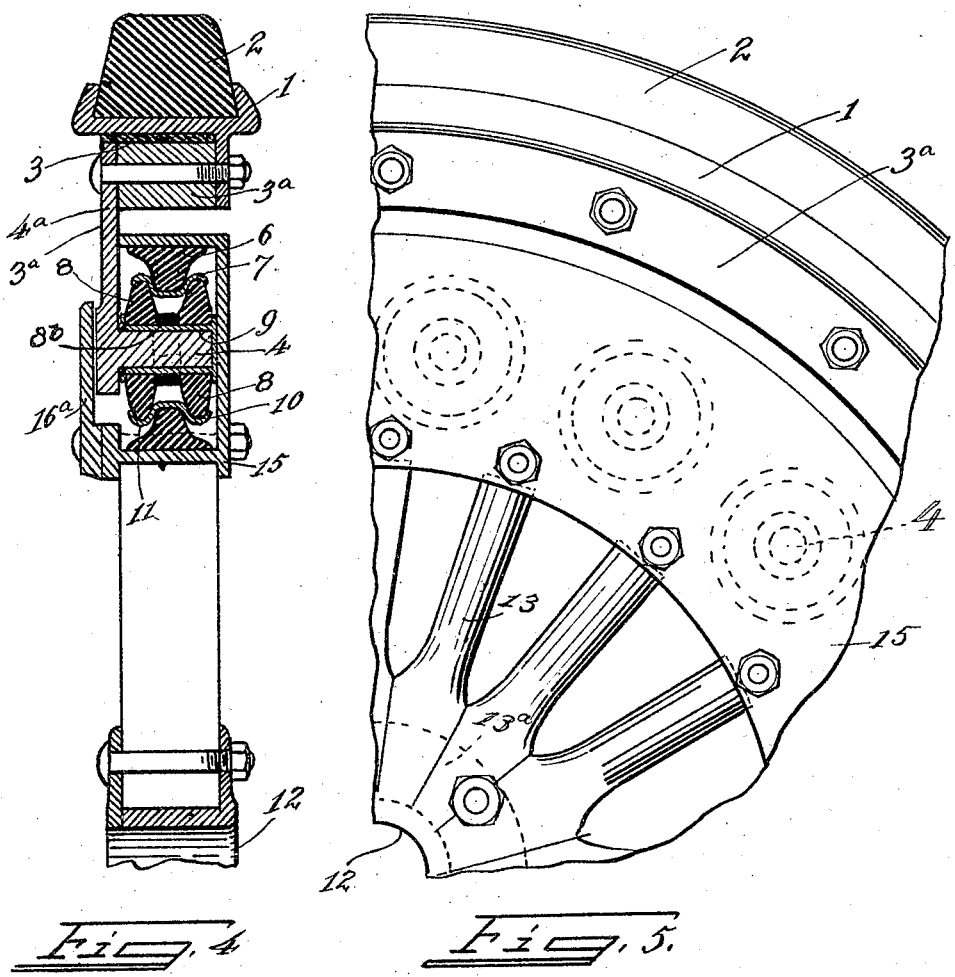

Patented Feb. 12, 1924.

1,483,191

UNITED STATES PATENT OFFICE.

RUPERT H. LANGDALE, OF CINCINNATI, OHIO.

RESILIENT WHEEL.

Application filed November 4, 1921. Serial No. 512,801.

*To all whom it may concern:*

Be it known that I, RUPERT H. LANGDALE, a citizen of the United States, and a resident of Cincinnati, in the county of Hamilton and State of Ohio, have invented certain new and useful Improvements in Resilient Wheels, of which the following is a full, clear, and exact description, reference being had to the accompanying drawings, forming part of this specification.

My invention relates to resilient wheels as used in vehicles and the like, which eliminates the pneumatic tire, and thereby extends greatly the period of life of the tire.

In my co-pending applications Serial No. 338,921 filed November 18, 1919, and Serial No. 438,995, filed January 21, 1921, I have described a variety of resilient wheels in which the spring elements are free of attachment to any parts of the wheel, but are held in a floating capacity in pockets with the outer and inner parts of the wheel spaced apart by said floating springs. In the latter application, I have described a form of rubber core for the floating spring devices, which relieves the springs of light duty and enables them to be made very heavy so that they will have a longer life and less chance of crystallization and fracture.

In the present invention I provide a form of rubber core for the spring devices, or, if desired, to be used as the sole spacing element between the hub and periphery of a wheel. In the latter case it will be of somewhat larger diameter, but in each case the object is to provide for a wide distance of resilient take-up within a confined space. More specifically I suspend one portion of the rubber element in a groove in between the other elements, so that each element may be compressed a considerable distance and yet the insertion of one part in the other saves much space.

Stated in another way it is the object of my invention to provide a rubber or other resilient material device, which while not using so effective a width of rubber, that it could not be satisfactorily confined in a wheel, yet uses a large cross section area of contraction and expansion.

These objects I accomplish by that certain construction and arrangement of parts to be hereinafter more specifically pointed out and claimed.

In the drawings,

Figure 4 is a cross section through a modified form of wheel showing the device used as the sole resilient element of a wheel (excluding the outer tire).

Figure 5 is a detail side elevation of a modified form of wheel showing a like arrangement to that of Figure 4.

Figure 1:
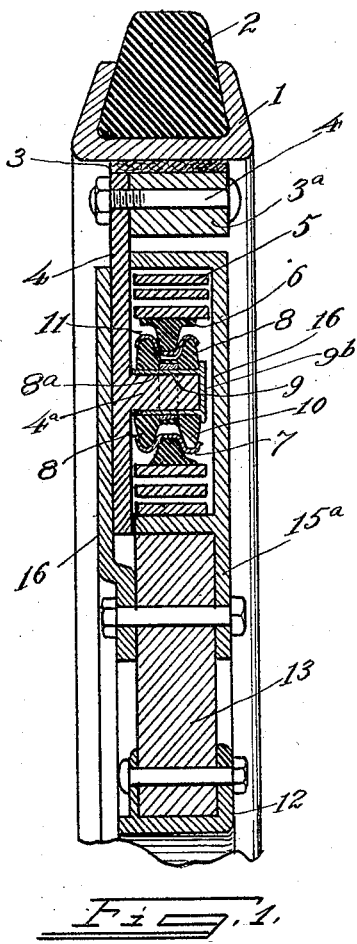
Figure 1 is a detail cross section through a wheel showing my resilient element as a core of a supporting coil spring.
Figure 2:
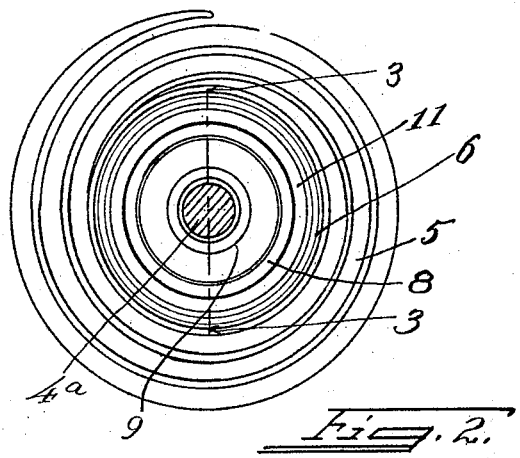
Figure 2 is a face view of a spring and resilient core element.

The wheel of the first three views has a rim 1 on which is a resilient rubber tire 2. Said rim is pressed over a steel felly rim 3. The rim 3 is shrunk on an annular wood felly $3^a$. A felly web 4 is bolted to felly $3^b$ and extends inwardly toward the hub where it is studded with posts $4^a$ to engage the various spring devices. In the preferred construction as illustrated in Figures 1 and 2, I employ a heavy helical metallic spring 5 which surrounds and bears between the ring casing 15 and the novel cores.

These cores are each made up of an outer ring of rubber 6 which has its inner portion formed into a tapering rib 7. There are also inner rings of rubber 8 having a bushing 9 therein to engage over the posts on the felly web. The said inner rings are formed into ridges 10, 10, on their peripheries, and over these peripheries are set a metal ring 11, which is bent inwardly at the center to lie between the ridges and provided with turned-in edges which hook over the crests of the said ridges. The bushings 9 have their ends closed as at $9^b$, and a packing ring $9^c$ is set into the open ends in a suitable groove. This provides an excellent means of retaining lubricant for the bearing at these points.

The ridges on the outer pieces 6 seat in the bent inward centers of the rings 11 and are thus held against dislodgement therefrom. A spacer ring $8^a$ is used between the rings 8 or else they are connected by a web of rubber $8^b$ (Figure 4).

The hub of the wheel is provided with plates 12 to which are bolted the spokes 13. These spokes have alternately faced, transversely beveled ends $13^a$ to interlock. They are also wedged into recesses in the ring 15

(Figure 4) or bolted in place between a plate 15ª and a plate 16 (Figure 1).

The plate or ring 15 is formed with a series of pockets for the spring and core devices, above described, and spaced to center with the spacing of the posts 4 on the felly web. The plate 16 or 16ª (bolted to members 15ª or 15 respectively) extends past the web 4 or 4ª on the wheel felly so as to prevent a misalignment of this felly web by means of the spring pocket on the one side thereof and the said plate 16 or 16ª on the other.

It will be noted of this construction that the spring device is purely floating in the pocket, and that the spring itself may be heavy and lasting. The rubber portions are so made up that the complete cross sectional area subject to contraction and expansion is the sum of the two ridged elements. If the overlapping were not present so wide a rubber section would buckle and be hard to confine against getting into misalignment. The resiliency of the rubber might also be termed progressive, since the tapered ends of the ridges would contract first until the spaces were all taken up and then the whole body of rubber would still have further but more resistant compressibility.

Referring to Figure 4 it will be noted that I have omitted any showing of the spring, and use the rubber as the sole resilient agent in the pockets.

In either the instance of the use of helical springs, as at 5, or without springs, the rubber devices may be the same, except for the proportions thereof.

The bushings are forced into the inner disks, the latter being made with a smaller bore originally than the bushings, and the bushings are burred over at their open ends to seat in the rubber rings permanently. The outer rings seat in the channeled metal pieces 11 and are of larger outer diameter than the pockets in which they are placed, or, in case of the springs, of the aperture left inside of the coil.

Figure 3:
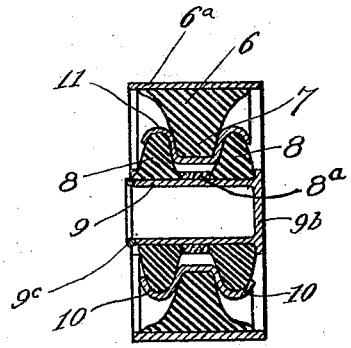
Figure 3 is a section on the line 3—3 of Figure 2.

Also, as shown in Figure 3, the rubber unit may be set within an outer ring 6ª of its own, so as to make up a unit that can be driven into the desired pockets of the wheel structures or into the inner circumference of the springs.

The use of a wooden felly and interspaced wooden spokes in a spring pocket wheel of the type above described, gives a resiliency to the wheel itself, which saves the life of the parts, and, of course, to a certain extent takes up vibrations and jars imparted to the tire during travel.

The spoke arrangement I have found necessary because of the proportionately large duty to be performed compared to that placed on the usual spokes in wheels.

I do not desire to limit myself to the exact structure described in any of the modifications above set forth, or to be confined other than to the usual basis of equivalents to structures claimed, because of my failure to point out above all of the various equivalent structures embodying the teachings of the invention.

Having thus described my invention, what I claim as new and desire to secure by Letters Patent, is:—

1. A resilient supporting element in wheels, comprising inner and outer concentric rubber portions, one of said portions being formed with a plurality of ridges therein, the other of said portions formed with individual ridges adapted to be seated within the plural ridges, and a hanger device on the plural ridges to support the individual ridges in position inset within them, for the purpose described.

2. A resilient supporting element in wheels, comprising inner and outer concentric rubber rings, the one having single ridges formed therein, the other having double ridges, between which the single ridges are set when the device is assembled, and a hanger device on the double ridges to support the single ridges between them, for the purpose described.

3. A resilient supporting element in wheels, comprising inner and outer concentric rubber rings, the one having single ridges formed therein, the other having double ridges, between which the single ridges are set when the device is assembled, and a hanger device on the double ridges to support the single ridges between them for the purpose described, said hanger comprising a metallic band having edges adapted to seat on the double ridges and a depressed, central portion into which the single ridge is seated.

4. A resilient wheel comprising a felly and hub, and a pocket forming member on the one of said parts, and a supporting element on the other of said parts, a resilient element mounted on the supporting element, a resilient element mounted in the pocket forming member, said elements comprising rings of rubber or the like, one of the rings having a double ridge, the other of the rings having a single ridge, and a hanger on the double ridge adapted to support the single ridge in an inset relation within the inter-ridge space.

5. A resilient wheel comprising a hub and felly, a wheel, a post on the felly, and a cup on the hub, and a resilient member to seat in the cup and engage over the post, comprising a heavy coiled spring to take great shocks, and a core within said spring, comprising an inner and an outer ring member of rubber, one of said members having a channel peripherally thereof, and the other member having a ridge to lie within said channel, and a hanger on the first noted ring adapted to support the ridge in said channel, but out of normal contact with the base thereof.

6. A resilient element for spring wheels adapted for seating in a wheel pocket, and engaging over a post centered with said pocket, comprising an inner rubber element having two ridges, a metal ring supported on the ridges so as to overhang the space between said ridges, an outer rubber element supported in said metal ring, and a bushing member in the inner element, said bushing member having a closed end, whereby it will retain grease when set over a post.

7. A resilient element for spring wheels adapted for seating in a wheel pocket, and engaging over a post centered with said pocket, comprising an inner rubber element having two ridges, a metal ring supported on the ridges, so as to overhang the space between said ridges, an outer rubber element supported in said ring, and a metal ring outside of the outer rubber element, as and for the purpose described.

RUPERT H. LANGDALE.